(12) United States Patent
Barberis et al.

(10) Patent No.: US 7,334,849 B2
(45) Date of Patent: Feb. 26, 2008

(54) ELECTRONIC CONTROL SYSTEM FOR CONTROLLING THE BRAKES FITTED ON A RAIL OR LIGHT RAIL MOTIVE POWER UNIT

(75) Inventors: Dario Barberis, Turin (IT); Paolo Pagliero, Cherasco (IT); Roberto Correndo, Carmagnola (IT)

(73) Assignee: SAB WABCO S.p.A., Piossasco (Torino) (IT)

( * ) Notice: Subject to any disclaimer, the term of this patent is extended or adjusted under 35 U.S.C. 154(b) by 181 days.

(21) Appl. No.: 11/022,659

(22) Filed: Dec. 28, 2004

(65) Prior Publication Data

US 2005/0140204 A1 Jun. 30, 2005

(30) Foreign Application Priority Data

Dec. 30, 2003 (IT) .......................... TO2003A1056

(51) Int. Cl.
*B60T 8/34* (2006.01)
(52) U.S. Cl. ..................... 303/128; 303/36; 303/74
(58) Field of Classification Search ................ 303/128, 303/3, 7, 9, 15, 36, 74, 77, 81, 82, 84.2
See application file for complete search history.

(56) References Cited

U.S. PATENT DOCUMENTS 5,538,331 A 7/1996 Kettle, Jr.
5,924,774 A 7/1999 Cook et al.
5,967,622 A * 10/1999 Dimsa et al. ................. 303/86
6,325,464 B2 * 12/2001 Truglio et al. ................. 303/7
2002/0163248 A1 11/2002 Wood et al.
2002/0180264 A1 12/2002 Moffitt
2003/0205927 A1 11/2003 Kettle, Jr.

FOREIGN PATENT DOCUMENTS

EP 0 278 928 A1 8/1988
EP 0 722 869 A2 7/1996
WO WO 99/24298 A1 5/1999

* cited by examiner

*Primary Examiner*—Xuan Lan Nguyen
(74) *Attorney, Agent, or Firm*—Sughrue Mion, Pllc.

(57) ABSTRACT

A system for controlling brakes on a rail or light rail motive power unit, in which the brakes are provided with a pneumatic braking system including a pneumatic main pipe and a pneumatic brake pipe. The system includes a control unit, manually operated actuating devices, a relay valve interposed between the pneumatic main pipe and the brake pipe, an electro-pneumatic control unit operable under the control of the unit to supply a variable braking control pressure, pneumatic back-up devices operable under the control of the actuating devices to supply a pneumatic back-up pressure which can be used to control the braking, and an enabling valve which can be switched between a normal operating condition and a back-up operating condition in which it can connect a control inlet of the relay valve selectively to the outlet of the electropneumatic unit or to the back-up devices.

10 Claims, 3 Drawing Sheets

ELECTRONIC CONTROL SYSTEM FOR CONTROLLING THE BRAKES FITTED ON A RAIL OR LIGHT RAIL MOTIVE POWER UNIT

BACKGROUND OF THE INVENTION

The present invention relates to a system for controlling the brakes on a rail or light rail motive power unit, where these brakes are provided with a pneumatic braking system including a pneumatic main pipe and a pneumatic brake pipe.

SUMMARY OF THE INVENTION

More particularly, the invention relates to a system comprising
an electronic control unit,
manually controlled actuating means,
a pneumatic relay valve interposed between the main pipe and the brake pipe, and provided with a pneumatic control inlet,
an electropneumatic control unit, connected to the main pipe and operable under the control of the said unit to supply a variable brake operating pressure at its outlet;
pneumatic back-up means connected to the main pneumatic pipe and operable under the control of the said manually controlled actuating means to supply a pneumatic back-up pressure at its outlet for use in the control of the brakes; and
valve means for enabling the back-up, these means being selectively switchable between a normal operating condition and an emergency operating condition in which they can connect the control inlet of the said relay valve selectively to the outlet of the said electropneumatic unit or to the said back-up means.

The object of the present invention is to provide a brake control system of the type specified above, having improved characteristics to enhance its functionality, particularly for operation in back-up conditions, in other words when the brake control makes use of the pneumatic pressure supplied by the aforesaid pneumatic back-up means.

BRIEF DESCRIPTION OF THE DRAWINGS

This and other objects are achieved according to the invention with a system of the type described above, characterized principally in that
the aforesaid relay valve is a valve with two control sections and has an additional control inlet, and in that there is also provided
a control valve unit interposed between the outlet of the aforesaid enabling valve means and the said additional control inlet of the relay valve;
the said control valve unit being selectively operable when the said enabling valve means are in the aforesaid condition of back-up operation, and being capable—when activated—of creating an increase or overcharge of the operating pressure emitted from the outlet of the relay valve towards the brake pipe, and—when disabled—of subsequently discharging this pressure overcharge, according to predetermined temporal laws.

Further characteristics and advantages of the invention will be made clear by the following detailed description, provided purely by way of example and without restrictive intent, with reference to the attached drawings, in which.

DETAILED DESCRIPTION OF THE INVENTION

Figure 1:
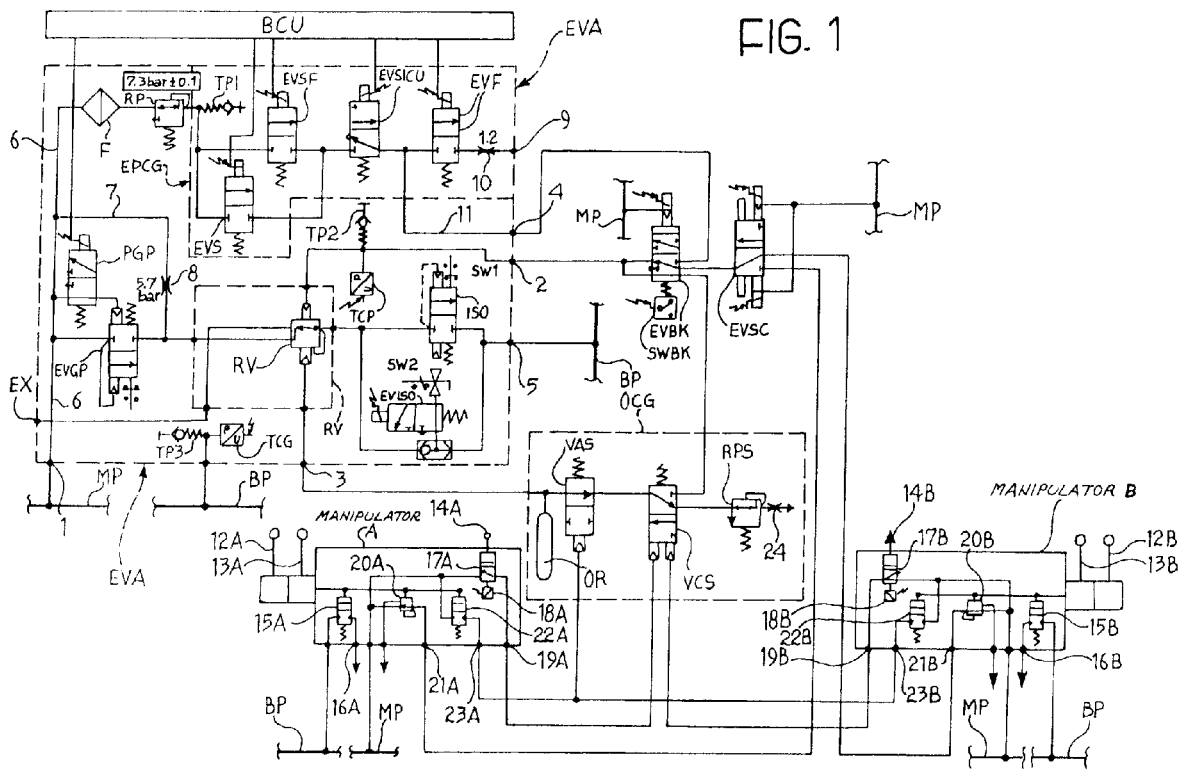
FIG. 1 is a diagram, partially in block form, of a first embodiment of a system according to the present invention.

FIG. 1 is a block diagram of a first embodiment of a system according to the invention, for operating the brakes on a rail or light rail motive power unit, where these brakes are provided with a pneumatic braking system including a pneumatic main pipe indicated by "MP", and a general pneumatic pipe ("brake pipe"), indicated by "BP".

The system comprises an electronic brake control unit, indicated by "BCU", designed in a known way to control the operation of an electrical valve assembly indicated in a general way by "EVA".

This electrical valve assembly is, for example, similar to that produced and marketed by the applicant under the trade name Eurotrol.

The electrical valve assembly EVA has an inlet 1 connected to the main pneumatic pipe MP and two inlets 2 and 3 for receiving control pressures for a relay valve RV included in this electrical valve assembly. The inlet 2 is associated with a test point TP2 and a pressure transducer TCP connected to the control unit BCU in a way which is not illustrated.

The electrical valve assembly EVA also has an outlet 4 from which a variable brake operating pressure is emitted in normal operation, and an outlet 5 connected to the brake pipe BP.

Within the electrical valve assembly EVA, a line 6 connects the inlet 1 to a filter F located upstream of a pressure regulator RP, and to the inlet of a high-capacity valve EVGP, associated with an electrical control valve PGP controlled by the unit BCU. A by-pass pipe 7, in which a restricted calibrated passage 8 is interposed, interconnects the inlet and outlet of the valve EVGP. The calibrated passage 8 limits the flow rate through the by-pass pipe 7 to a level below that found in the valve EVGP.

The outlet of the valve EVGP and the by-pass pipe 7 are connected to the inlet of the relay valve RV. The latter has a vent outlet connected to a discharge outlet EX of the electrical valve assembly EVA.

The outlet of the relay valve RV is connected to the outlet 5 of the electrical valve assembly EVA and consequently to the brake pipe BP, through an isolating electrical valve unit including a pneumatic isolation valve ISO and an associated electrical control valve EVISO, controlled by the unit BCU.

Finally, the electrical valve assembly comprises an electropneumatic control unit indicated as a whole by "EPCG". This unit comprises an electrical braking valve EVF and an electrical brake release valve EVSF controlled by the unit BCU, an electrical safety valve EVSICU being interposed between these valves and also controlled by the said unit. The electrical valve EVF is connected to a vent outlet 9 via a calibrated passage 10.

The outlet 4 of the electrical valve assembly EVA is connected via a line 11 to an intermediate point between the electrical valves EVF and EVSICU.

A further electrical valve EVS, controlled by the unit BCU, is connected in parallel with the electrical valve EVSF.

The inlets of the electrical valves EVSF and EVS are connected to the outlet of the pressure regulator RP, where a test point TP1 is provided.

Finally, the electrical valve assembly EVA in the embodiment shown in FIG. 1 comprises an electrical pressure transducer TCG for supplying the unit BCU with signals indicating the pressure in the brake pipe BP, at a test point indicated by "TP3".

In FIG. 1, A and B indicate two manually controlled actuating devices (called "manipulators"), each of which is located in a corresponding cab of a rail or light rail motive power unit. However, the invention is not limited to embodiments in which two such actuating devices are present, but is equally applicable to a system in which only one of these devices is provided.

The actuating devices A and B are, for example, of the two-lever type 12A, 13A and 12B, 13B respectively, for controlling the brake, with associated push buttons 14A and 14B for controlling the pressure overcharge.

Each manipulator A, B comprises:

- a corresponding on/off valve 15A, 15B, located between the brake pipe BP and a discharge aperture 16A, 16B; these valves 15A, 15B are used to control the emergency braking (known as "fast" braking);
- a corresponding two-way two-position valve 17A, 17B, switchable by means of the associated push button 14A, 14B, and associated with an electrical switch 18A, 18B acting as a position sensor, connected to the unit BCU; the valve 17A, 17B is interposed between the main pipe MP and an outlet 19A, 19B of the corresponding manipulator;
- a corresponding automatic regulator device 20A, 20B, interposed between the main pipe MP and an outlet 21A, 21B of the corresponding manipulator; each automatic regulator device is operated by an associated lever of the manipulator and supplies at its outlet a variable operating pressure (from 3 to 5 bar for example) as the position of the said lever varies; and
- a further valve 22A, 22B of the on/off type, interposed between the inlet of the associated valve 17A, 17B and an outlet 23A, 23B of the manipulator.

The outlets 21A and 21B of the manipulators A and B, called back-up outlets for reasons which are made clear below, are connected to two different inlets of a bistable electrical valve EVSC, connected to the main pipe MP and controlled by the unit BCU. This electrical valve EVSC has an outlet connected to a first inlet of an electrical back-up enabling valve EVBK connected to the main pipe MP and also controlled by the unit BCU.

In the embodiment shown in FIG. 1, the electrical enabling valve EVBK is a three-way two-position electrical valve, and has another inlet connected to the outlet 4 of the electrical valve assembly EVA, and a further inlet connected to a valve unit for controlling (and discharging) the pressure overcharge, indicated as a whole by "OCG", which is described more fully below.

In the illustrated embodiment, the pressure overcharge control valve unit OCG comprises a two-way two-position pneumatic control valve VCS, provided with two pneumatic control inlets connected to the outlets 19A, 19B of the manipulators A and B. The valve VCS has an inlet connected to an outlet of the electrical enabling valve EVBK, and an inlet-outlet connected to the inlet 3 of the electrical valve assembly EVA via a pneumatic memory valve VAS of the on/off type, whose pneumatic control inlet is connected to the outlets 23A, 23B of the manipulators A and B, whose functions are described below.

The valve VCS has a further outlet connected to the atmosphere via a discharge pressure regulator RPS and a calibrated throttle 24.

The valve unit OCG also comprises a reservoir OR having a predetermined capacity.

With reference to FIG. 1, it should be noted that all the valves are shown in their non-energized position and in the absence of air.

The system described above essentially operates as follows.

The system can operate in a normal mode, controlled by the control unit BCU, and, if a pneumatic or electronic fault condition occurs, in a back-up mode.

Switching between the normal operating condition and the back-up operating condition is carried out by means of the electrical enabling valve EVBK.

Normal Operating Mode

In this operating mode, the electrical enabling valve EVBK is constantly energized, and connects the outlet 4 of the electrical valve assembly EVA to the inlet 2 of the latter (and therefore to the first control inlet of the relay valve RV). In this condition, the electrical enabling valve EVBK pneumatically isolates the manipulators A and B and the overcharge control unit OCG from the relay valve RV.

In normal operation, the unit BCU controls the electropneumatic control unit EPCG, which supplies at the outlet 4 of the electrical valve assembly EVA a control pressure, which is taken through the electrical enabling valve EVBK to the upper control inlet of the relay valve RV. The latter valve accordingly determines the level of pressure which is applied to the brake pipe BP (via the electrical isolating valve unit ISO-EVISO).

According to requirements, and particularly in brake release phases, the unit BCU connects the inlet of the relay valve RV to the main pipe MP via the by-pass pipe 7-8, or additionally via the high-capacity electrical valve EVGP.

In the normal operating mode, all the braking functions and procedures are controlled by the unit BCU, including the so-called pressure overcharge, its discharge and the memorizing of this value.

Back-up Operating Mode

When a pneumatic or electronic emergency or fault situation arises in the system, the electrical enabling valve EVBK is automatically de-energized. As a result, the electropneumatic control unit EPCG of the electrical valve assembly EVA is isolated from the relay valve RV. In this condition, the control pressure for the relay valve RV is generated by the active manipulator A or B (preselected by means of the bistable electrical valve EVSC), and the overcharge control valve unit OCG is enabled.

In this configuration, the driver can control the pressure in the brake pipe BP, using the same manipulator as that used in the normal operating mode: the actuation of the levers of the active manipulator, by means of the associated automatic regulator device 20A, 20B, causes a pressure to be applied to the upper control inlet of the relay valve RV through the bistable electrical valve EVSC, the electrical enabling valve EVBK, and the inlet 2 of the electrical valve assembly EVA.

In the back-up operating mode, the driver can decide to introduce a pressure overcharge, and for this purpose he presses the button 14A or 14B of the active manipulator and thus causes the switching of the valve VCS of the overcharge control unit OCG. Consequently, the outlet of the electrical enabling valve EVBK is connected not only to the inlet 2 of the electrical valve assembly EVA, but also to the inlet 3 of the latter, through the valves VCS and VAS of the unit OCG. The pressure increase at the lower control inlet of the relay valve RV depends on the volume of the reservoir OR of the unit OCG. This volume determines the timing characteristic of the pressure overcharge applied to the brake pipe BP and the timing characteristic of the corresponding discharge through the discharge regulator RPS and the calibrated passage 24 when the push button 14A or 14B associated with the active manipulator is released.

All the functions described above remain available even if the electrical power supply to the driver's cab is cut off: the electrical enabling valve EVSC of the manipulator which is used is of the bistable type and therefore remains in the last position to which it was set, even if there is no power, and the electrical enabling valve EVBK is constantly de-energized in the back-up operating mode.

As an alternative to what is described above, the overcharge control push buttons 14A and 14B can be located not in the associated manipulators but in any other position in the cab which the driver can easily reach.

The electrical enabling valve EVBK is conveniently associated with a microswitch SWBK for indicating the condition or status of the valve, this microswitch being usable, for example, to cause the illumination of an optical signal when the system changes to the back-up operating mode.

FIG. 1 also shows schematically a solution in which the value of the pressure overcharge reached is memorized in the back-up operating mode during discharge, if the driver brakes. This function is activated pneumatically by means of the valve VAS which, at the command of the valve 22A, 22B actuated by means of the manipulator A or B, prevents the discharge of the pressure overcharge if the manipulator is in the braking position. When the manipulator is subsequently returned to the brake release position, the memory valve VAS is switched and allows a return to the overcharge level preceding the braking command, and allows it to be discharged according to the predetermined temporal law.

In the embodiment shown in FIG. 1, the valves 22A, 22B can be omitted, and in this case the memory valve VAS can be of the mechanically operated type, controlled directly by a lever of the said manipulators.

Figure 2:
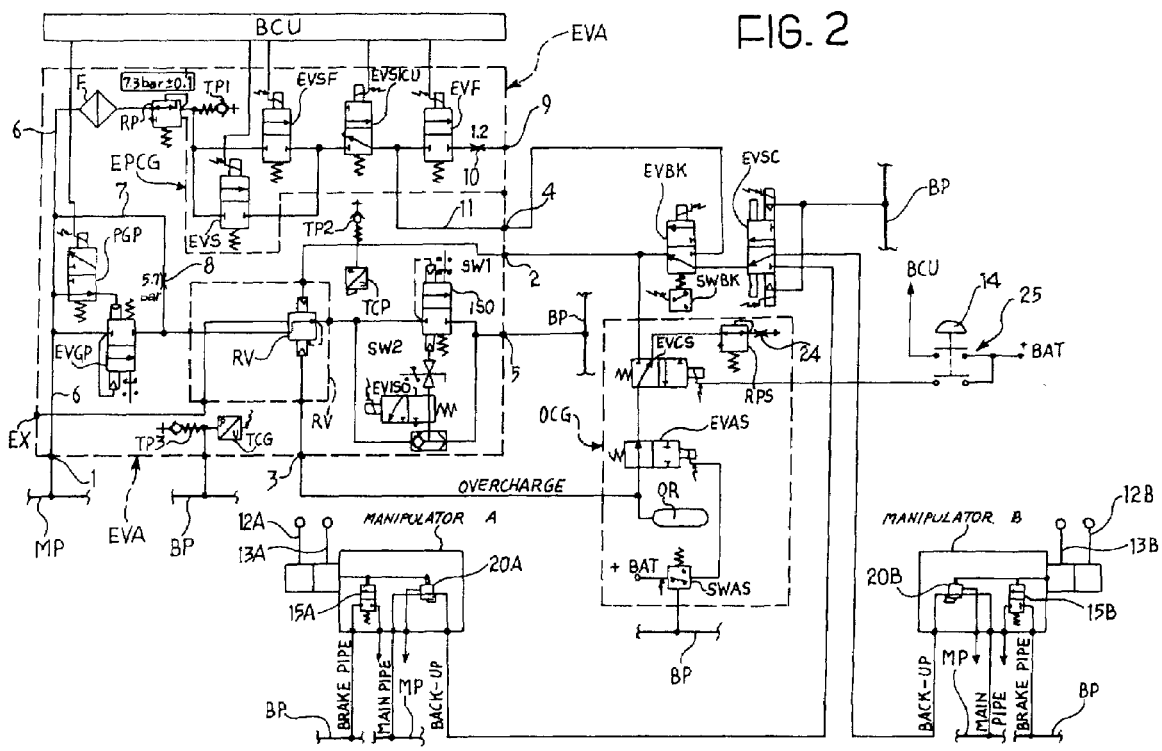
FIGS. 2 and 3 are diagrams, partially in block form, of two different embodiments of the system according to the invention.

FIG. 2 shows a variant embodiment of the system described above with reference to FIG. 1.

In FIG. 2, parts and elements identical or substantially corresponding to components described previously have been given the same alphanumeric reference symbols.

In the system shown in FIG. 2, the electrical valve assembly EVA is identical to that of FIG. 1, and the bistable electrical valve EVSC connected to the manipulators A and B is also unchanged.

The elements in FIG. 2 that have been changed with respect to FIG. 1 are the overcharge control valve unit OCG, the manipulators A and B, and the overcharge control, which can be activated electrically by means of electrical control buttons, only one of which, indicated by the number 14, is shown in the said figure for the sake of simplicity. This button, which can be free-standing or incorporated in the associated manipulator, controls a double electrical switch 25 for connecting a continuous voltage source BAT to an input of the control unit BCU and to the energizing input of a two-way two-position electrical valve EVCS included in the overcharge control valve unit OCG. This electrical valve has a function similar to that of the pneumatic valve VCS of FIG. 1, and has an inlet connected to the outlet of the electrical enabling valve EVBK, an inlet-outlet connected to the inlet 3 of the electrical valve assembly EVA through an electrical memory valve EVAS of the on/off type, and an outlet communicating with the atmosphere through a discharge pressure regulator RPS and an associated calibrated passage 24.

In the version of FIG. 2, the pressure overcharge control valve unit OCG again comprises a reservoir OR of predetermined volume, interposed between the electrical valves EVCS and EVAS. This valve unit OCG also comprises a threshold pressure switch SWAS, associated with the electrical valve EVAS and sensitive to the pressure in the brake pipe BP.

In the variant embodiment shown in FIG. 2, the electrical enabling valve EVBK is of the two-way two-position type, but its operating modes are similar to those of the equivalent valve of the system shown in FIG. 1.

In FIG. 2 also, all the valves have been shown in the non-energized condition and in the absence of air.

The system according to FIG. 2 operates essentially in the following way.

Normal Operating Mode

In this operating mode, the electrical enabling valve EVBK is permanently energized. The control pressure produced by the electropneumatic unit EPCG is applied to the upper control inlet of the relay valve RV through the electrical enabling valve EVBK. The manipulators A and B are disconnected from the relay valve RV by the electrical enabling valve EVBK. The overcharge control valve unit OCG is electrically disabled (electrical valves EVCS and EVAS de-energized).

In these conditions, the braking procedures are entirely controlled by the unit BCU, including any pressure overcharge, its release, and any memorizing of this pressure overcharge.

Back-up Operating Mode

When a pneumatic and/or electronic emergency or fault condition appears, the system changes to the back-up operating mode. In this operating mode, the electrical enabling valve EVBK is automatically de-energized. The electropneumatic unit EPCG is consequently disconnected from the relay valve RV, whose upper control section can instead receive a control pressure from the active manipulator A or B.

The overcharge control valve unit OCG is electrically enabled (electrical valves EVCS and EVAS energized). In this configuration also, the driver can control the pressure in the brake pipe BP, using the same active manipulator as that used in the normal operating mode.

In the back-up operating mode, the pressure overcharge can be activated by pushing the button 14. When this button is pushed, the unit OCG is controlled, and starts the pressure supply to the lower control section of the relay valve RV, with a timing determined by the volume of the reservoir OR. The relay valve RV therefore creates an overpressure or overcharge in the brake pipe BP, depending on the geometrical difference between its two diaphragms.

When the overcharge control button 14 is released, the unit OCG changes its state, and the control pressure on the lower section of the relay valve RV starts to decrease, with a release timing determined by the volume of the reservoir OR and by the diameter of the calibrated aperture 24.

The system according to FIG. 2 also enables the value of the pressure overcharge reached to be memorized in the back-up operating mode if the driver brakes. In this condition, the threshold pressure switch SWAS, calibrated for example for a 5 bar threshold, sets the valve EVAS to the position in which it shuts off the flow, and the pressure overcharge is memorized. On braking, the switch SWAS causes the electrical valve EVAS to switch to the passage position when the pressure in the brake pipe BP reaches 5 bar, triggering the unit OCG which causes the pressure to rise again in the brake pipe BP and to be released subsequently when the lower control section of the relay valve RV is operated.

The threshold pressure switch SWAS can be replaced with a microswitch connected mechanically to the levers of the manipulators which operate the brakes.

Figure 3:
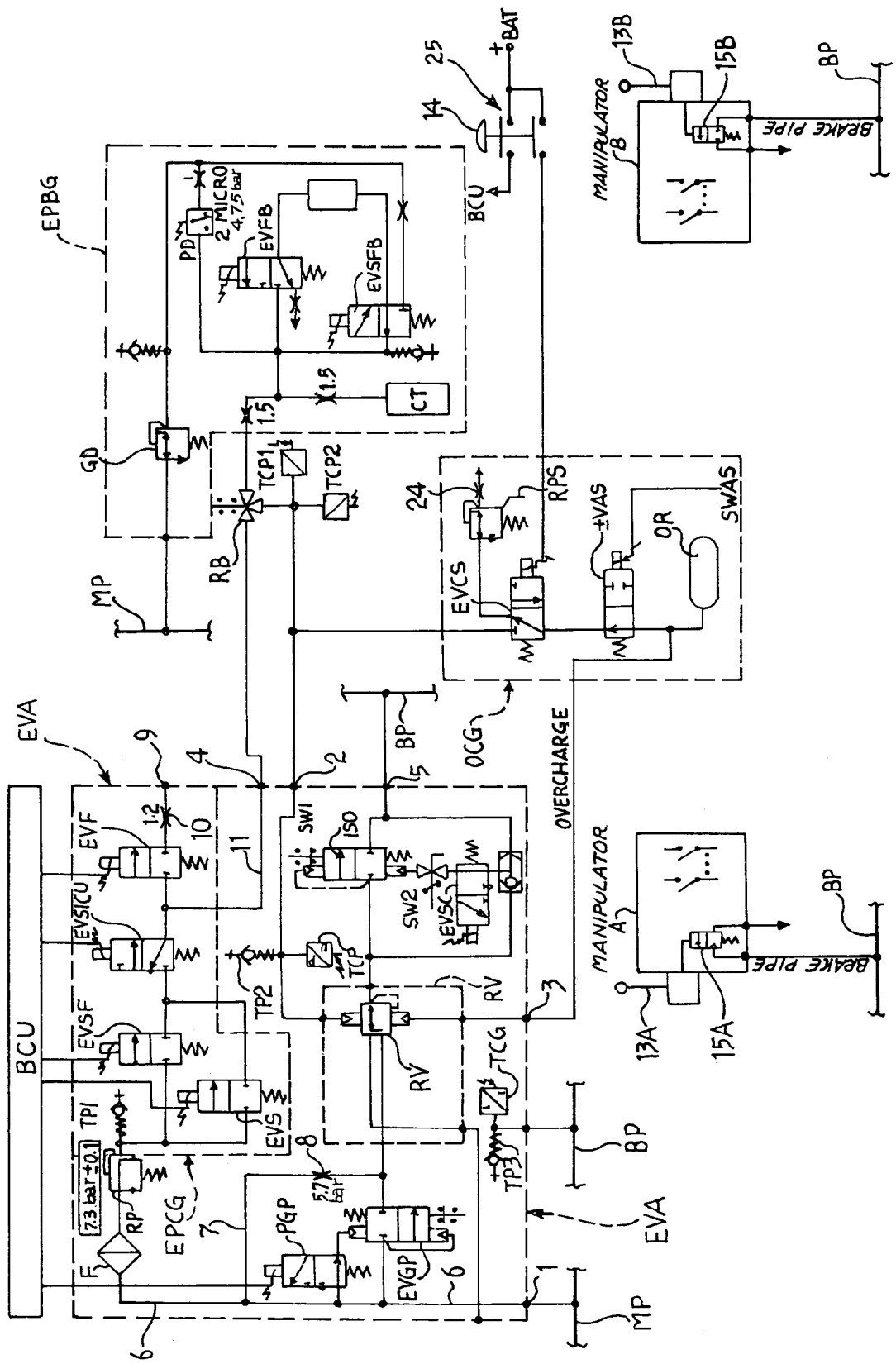

FIG. 3 shows a further variant embodiment of a system according to the invention. In this figure also, parts and elements identical or substantially equivalent to components described previously have been given the same alphabetic or numerical reference symbols.

In the system shown in FIG. 3, the electrical valve assembly EVA is again identical to that described previously with reference to FIG. 1.

In the system shown in FIG. 3, the electrical enabling valve used in the preceding systems is absent. In place of this electrical valve there is a valve device consisting of a manual three-way cock RB for selectively connecting the inlet 2 of the electrical valve assembly EVA to the outlet 4 of the latter, or to the outlet of a back-up electropneumatic unit EPBG, of a known type, which has an inlet connected to the main pipe MP and which comprises two electrical valves EVFB and EVSFB, for braking and for releasing the brakes respectively.

In this case, the manipulators A and B are not connected to the main pipe MP, but only to the general pipe BP, through the valves 15A and 15B. As for the remaining elements, the manipulators A and B are purely "electrical" in this case, and each has a single multi-position timing lever 13A and 13B, in the form of a joystick. This lever can be set, for example, to an intermediate rest position, a first forward position for operating the brakes with a normal flow rate, a second forward position for braking with a high flow rate, a first reverse position for braking, and a second reverse position for emergency braking (known as "fast" braking).

The lever of each manipulator is associated with position detectors connected to the control unit BCU. Each of these levers is associated, for example, with three microswitches for supplying the unit BCU with operating information for braking (at normal and high flow rates) and for brake release, two further microswitches for directly controlling the energizing of the electrical braking valves EVFB and brake release valves EVSFB of the EPGB unit, and finally a microswitch for opening a security loop (not shown) in emergency conditions.

Each manipulator A and B is associated with a corresponding electrical overcharge control push button, only one of which, indicated by 14 as in FIG. 2, is shown in FIG. 3 for the sake of simplicity.

The overcharge control valve unit OCG of FIG. 3 also corresponds to that of FIG. 2.

The cock RB is conveniently associated with a microcontact or the like for signalling its condition to the console, this device also being usable to enable the facility of controlling the back-up electrical valves of the EPBG unit.

In the back-up operating mode, the electrical valves EVFB and EVSFB of the unit EPBG are activated directly by corresponding microwitches associated with the lever of the enabled manipulator, and generate a control pressure which is sent to the upper control section of the relay valve RV through the cock RB.

As regards the control and discharge of the pressure overcharge, the system of FIG. 3 operates in exactly the same way as the system shown in FIG. 2.

Clearly, provided that the principle of the invention is retained, the forms of application and the details of construction can be varied widely from what has been described and illustrated purely by way of example and without restrictive intent, without thereby departing from the scope of protection of the present invention as defined by the attached claims.

What is claimed is:

1. System for controlling the brakes on a rail or light rail motive power unit, where these brakes are provided with a pneumatic braking system including a pneumatic main pipe and a pneumatic brake pipe;
the system comprising
an electronic control unit,
manually controlled actuating means,
a pneumatic relay valve interposed between the main pipe and the brake pipe, and provided with a pneumatic control inlet,
an electropneumatic control unit, connected to the main pipe and operable under the control of the electronic control unit to supply a variable brake control pressure;
pneumatic back-up means connected to the pneumatic main pipe and operable to supply, under the control of said manually controlled actuating means, an outlet pneumatic back-up pressure for use in the control of the brakes; and
enabling valve means, switchable between a normal operating condition and a back-up operating condition for connecting the control inlet of said relay valve selectively to the outlet of the electropneumatic control unit or to the back-up means;
said relay valve being a valve with two control sections and having an additional control inlet,
a control valve unit being interposed between the outlet of the aforesaid enabling valve means and the additional control inlet of the relay valve;
said control valve unit being activatable when the enabling valve means are in the back-up operating condition, and being capable—when activated—of creating an increase or overcharge of the operating pressure emitted from the relay valve towards the brake pipe, and—when disabled—of subsequently discharging said pressure overcharge, according to predetermined time functions.

2. System according, to claim 1, in which the control valve unit comprises a control valve for selectively connecting an outlet of the enabling valve means to the further control inlet of the relay valve or to a calibrated vent pipe.

3. System according to claim 2, in which the control valve is of the type controllable pneumatically or mechanically by the activation of the manually controlled actuating means.

4. System according to claim 2, in which the control valve is an electrical valve adapted to be energized by the activation of the manually controlled actuating means.

5. System according to claim 2, in which the control valve unit comprises a pneumatic memory valve of the on-off type, interposed between the control valve and the further control inlet of the relay valve, and pneumatic reservoir of predetermined capacity, connected between the memory valve and the relay valve.

6. System according to claims 4 or 5, in which the memory valve is controlled by a threshold pressure switch as a function of the pressure in the brake pipe.

7. System according to claim 1, in which the enabling valve means comprise an electrical valve arranged such that in an energized condition said electrical valve connects the first control inlet of the relay valve to the outlet of the electropneumatic control unit, while in a de-energized condition said electrical valve connects the first control inlet of the relay valve to the pneumatic back-up means.

8. System according to claim 2, in which the electrical valve means comprise a manually actuated three-way cock.

9. System according to claim 1, in which the manually controlled actuating means comprises at least one push-button control device which is activatable to create, in the back-up operating condition, an increase or overcharge of the control pressure emitted from the relay valve towards the brake pipe.

10. System according to claim 9, in which the manually controlled actuating means comprise at least one manipulator device provided with at least one control lever, and in which the at least one push-button control device is incorporated in or separate from the manipulator device.

* * * * *